US012658065B2

(12) United States Patent
Shi et al.

(10) Patent No.: US 12,658,065 B2
(45) Date of Patent: Jun. 16, 2026

(54) METHOD FOR PREDICTING GAS EXPLOSION, VR-BASED EMERGENCY TRAINING SYSTEM AND METHOD

(71) Applicant: THE HONG KONG POLYTECHNIC UNIVERSITY, Hong Kong (CN)

(72) Inventors: Jihao Shi, Hong Kong (CN); Asif Sohail Usmani, Hong Kong (CN); Xinyan Huang, Hong Kong (CN); Xiaoning Zhang, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 0 days.

(21) Appl. No.: 19/063,985

(22) Filed: Feb. 26, 2025

(65) Prior Publication Data

US 2025/0273082 A1      Aug. 28, 2025

(30) Foreign Application Priority Data

Feb. 27, 2024    (CN) .......................... 202410216861.7

(51) Int. Cl.
    *G09B 5/06*       (2006.01)
    *G09B 9/00*       (2006.01)
(52) U.S. Cl.
    CPC .............. *G09B 5/065* (2013.01); *G09B 9/00* (2013.01)
(58) Field of Classification Search
    CPC ......... G09B 5/065; G09B 5/125; G09B 9/00; G09B 19/00; G09B 19/003; G09B 19/0069; G06F 3/012; A62C 99/0081
    See application file for complete search history.

(56) References Cited

U.S. PATENT DOCUMENTS

| | | | |
|---|---|---|---|
| 2021/0043011 A1* | 2/2021 | Gates ................... | G02B 27/017 |
| 2021/0116990 A1* | 4/2021 | Song ..................... | A63F 13/211 |
| 2022/0114905 A1* | 4/2022 | Shiffman ................ | G06F 1/163 |

FOREIGN PATENT DOCUMENTS

| | | | | |
|---|---|---|---|---|
| CN | 111612672 A | * | 9/2020 | ............. G06Q 50/26 |

OTHER PUBLICATIONS

Abbe, "Community Detection and Stochastic Block Models: Recent Developments", Journal of Machine Learning Research, 2018, 86 pages.

(Continued)

*Primary Examiner* — Kang Hu
*Assistant Examiner* — Correll T French
(74) *Attorney, Agent, or Firm* — CANTOR COLBURN LLP

(57) ABSTRACT

A method for predicting gas explosion. The method includes: obtaining a geometric model with spatial obstacles; determining a simulation dataset of the gas explosion based on the geometric model, where the simulation dataset is a dataset including process data of multiple gas explosion scenes in the geometric model, and a state vector of a spatial grid node in the simulation dataset includes a first moment, coordinate information and a target pressure value; optimizing, using the simulation dataset, a physics-informed GNN to obtain an optimized physics-informed GNN; and predicting the gas explosion in an obstructed gas explosion scenario using the optimized physics-informed GNN. This method is applied to use optimized physics-informed GNN to realize spatiotemporal second-level prediction of overpressure distribution and explosion wave propagations occurring in the obstructed gas explosion scenario, enhance the accuracy, the reliability and the efficiency of gas explosion prediction in the obstructed gas explosion scenario.

4 Claims, 7 Drawing Sheets

(56) References Cited

OTHER PUBLICATIONS

Battaglia et al. "Relational inductive biases, deep learning, and graph networks", Oct. 17, 2018, 40 pages.

Boccaletti et al. "Complex Networks: Structure and dynamics", Science Direct, 424, Jan. 10, 2006, 134 pages.

Chen et al. "A dynamic multi-agent approach for modeling the evolution of multi-hazard accident scenarios in chemical plants", Reliability Engineering and System Safety, 207, 2021, 14 pages.

Kearnes et al. "Molecular Graph Convolutions: Moving Beyond Fingerprints", Aug. 18, 2016, 29 pages.

Lan et al. "Modeling NaTech-related domino effects in process clusters: A network-based approach", Reliability Engineering & System Safety, vol. 221, May 2022, 10 pages.

Scarselli et al. "The Graph Neural Network Model", IEEE Transactions on Neural Networks, vol. 20, No. 1, Jan. 2009, 20 pages.

Shen et al. "Prediction of minimum ignition energy for combustible dust using graph neural networks and SMILES data augmentation", Powder Technology, vol. 429, Nov. 1, 2023, 9 pages.

Shi et al. "Physics_GNN: Towards Physics-informed graph neural network for real-time obstructed gas explosion simulation", 2018, 31 pages.

* cited by examiner

Obtaining a geometric model with spatial obstacles — S110

Determining a simulation dataset of the gas explosion based on the geometric model — S120

Optimizing, using the simulation dataset, a physics-informed GNN to obtain an optimized physics-informed GNN — S130

Predicting the gas explosion in an obstructed gas explosion scenario — S140

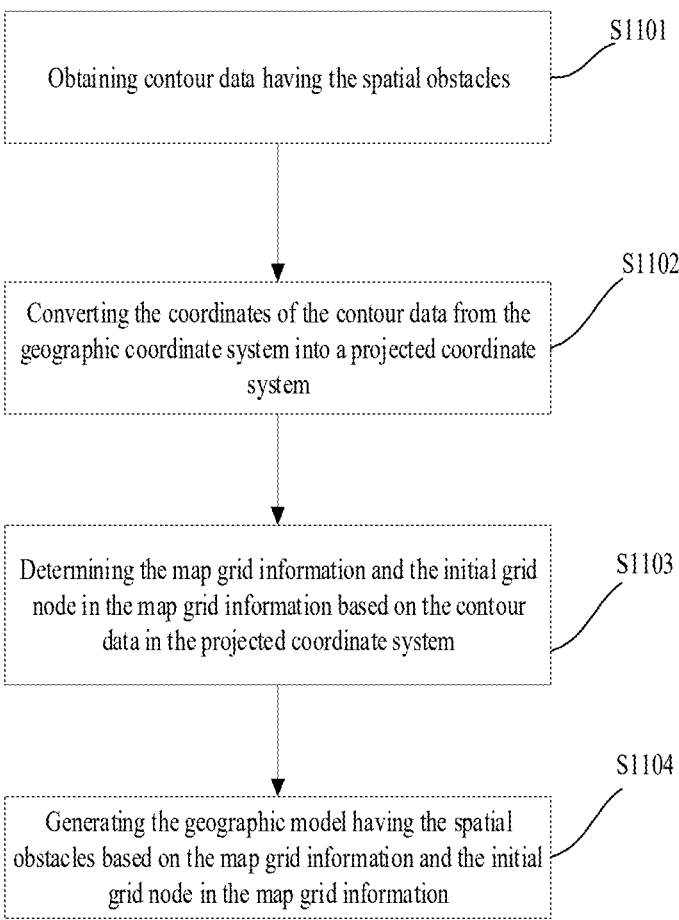

Obtaining contour data having the spatial obstacles — S1101

Converting the coordinates of the contour data from the geographic coordinate system into a projected coordinate system — S1102

Determining the map grid information and the initial grid node in the map grid information based on the contour data in the projected coordinate system — S1103

Generating the geographic model having the spatial obstacles based on the map grid information and the initial grid node in the map grid information — S1104

FIG. 2

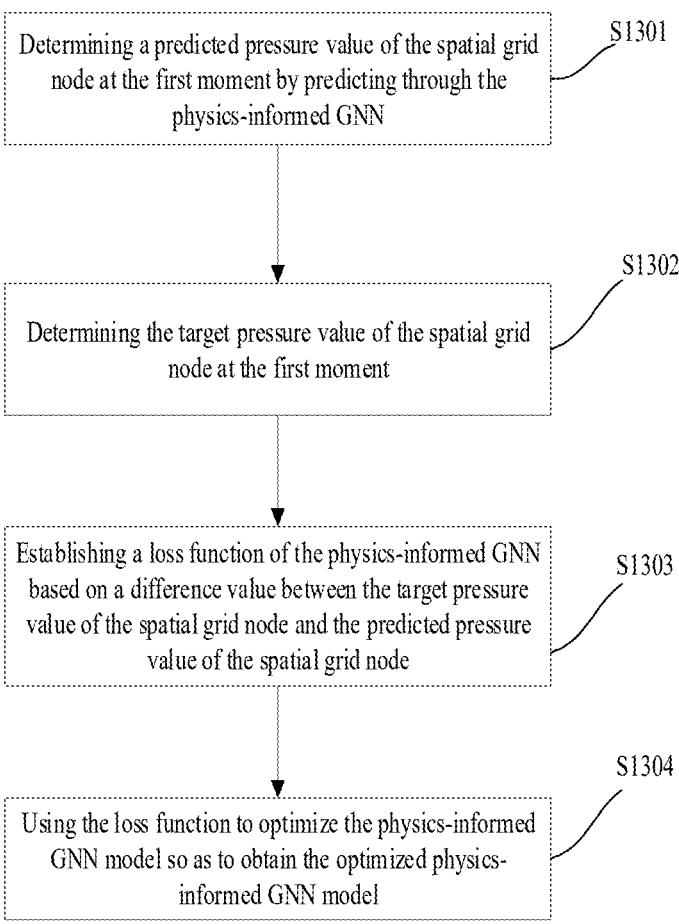

Determining a predicted pressure value of the spatial grid node at the first moment by predicting through the physics-informed GNN    S1301

Determining the target pressure value of the spatial grid node at the first moment    S1302

Establishing a loss function of the physics-informed GNN based on a difference value between the target pressure value of the spatial grid node and the predicted pressure value of the spatial grid node    S1303

Using the loss function to optimize the physics-informed GNN model so as to obtain the optimized physics-informed GNN model    S1304

FIG. 3

METHOD FOR PREDICTING GAS EXPLOSION, VR-BASED EMERGENCY TRAINING SYSTEM AND METHOD

CROSS-REFERENCE TO RELATED APPLICATION

Pursuant to 35 U.S.C. § 119 and the Paris Conversion, this application claims priority to Chinese patent application No. 202410216861.7, filed on Feb. 27, 2024, and entitled "method and apparatus for predicting gas explosion". The entire contents each of which is incorporated herein by reference.

TECHNICAL FIELD

The present invention relates to the fields of gas explosion prediction and industrial emergency preparedness training, and more particularly, to a method for predicting gas explosion, a VR-based emergency training system, and a VR-based emergency training method.

BACKGROUND

With the wide application of liquefied natural gas, liquefied hydrogen and other liquefied gas in urban energy transformation, accidental release of liquefied gas may cause urban-scale gas explosion accidents.

Aiming at the gas explosion accidents, an influence generated due to gas explosion may be reduced through gas explosion prediction. In the related art, some conventional prediction methods (e.g., CFD and empirical model combined method, machine learning method) for explosion overpressure are leveraged to predict gas explosion occurring at a specified position (e.g., a gas station, a tunnel, a pipeline, etc.).

However, when these conventional prediction methods for explosion overpressure are leveraged for predicting gas explosion occurring in a scene involving complex spatial obstacles, such as a city, these conventional methods have very low prediction accuracy and has a bad prediction effect.

In addition, machine/deep learning approaches applied to real-time gas explosion prediction are considered "black box" methods, they lack the capability to explicitly consider the physical interactions between congestion, flame, and blast wave propagation. Consequently, these methods may exhibit a significant prediction discrepancy, particularly in scenarios involving congestions and confinement, where the physical interactions plays a crucial role in gas explosion overpressure predictions. Moreover, in the related art, there are few studies that have specifically investigated the combination of physics or prior knowledge with GNN approaches for real-time blast load prediction in obstructed gas explosion scenarios. This represents a research gap where the combination of physics knowledge with GNNS, can potentially enhance the accuracy and efficiency of blast load predictions in complex scenarios.

The present disclosure overcomes the disadvantages of the existing prior art (e.g., the limitation of the conventional prediction methods on the prediction of gas explosion in the scene involving spatial obstacles) by introducing a method for predicting gas explosion that leverages an optimized physics-informed GNN to implement spatiotemporal second-level prediction of overpressure distribution and explosion wave propagations in the scene involving spatial obstacles.

The present disclosure also overcomes the disadvantages of the existing prior art (e.g., the machine/deep learning approaches exhibit significant prediction discrepancy) by introducing a VR-based emergency training system and a VR-based emergency training method which aim at providing the trainees with a virtual accidental scenario for emergency training based on accidental scenario condition data collected via IoT sensors, enabling the trainees to physically interact with the virtual accidental scenario using various VR devices and industrial equipment/tools, move around, and take appropriate actions within the virtual accidental scenario to mitigate the evolving emergency situation, thereby providing the trainees with a fully immersive, team-based training exercises within the virtual accidental scenario, thus avoiding the trainees from accidental injuries.

SUMMARY

The following presents a simplified summary to provide a basic understanding of the present invention. This summary is not an extensive overview of the present invention and is not intended to identify key features of the invention. Rather, it is to present some of the inventive concepts of this invention in a generalised form as a prelude to the detailed description that is to follow.

One of the advantages of the present disclosure is using a GNN model for processing graph structure data to train huge data in the simulation dataset, thereby reducing data calculation amount and improving calculation efficiency.

A further advantage of the present disclosure is establishing a loss function of the physics-informed GNN based on the simulation dataset and using the loss function to optimize the physics-informed GNN (update the parameters of the physics-informed GNN iteratively), thereby enabling the predicted pressure value of the physics-informed GNN to be approximate to the target pressure value. Additionally, the physics-informed GNN enhances the accuracy and the reliability of gas explosion predictions in scenarios involving obstructions because of presenting the interaction between the obstacles, flame and blast wave propagation compared to the state-of-the-art prediction models. The physics-informed GNN has the potential to analyze the obstructed gas explosion destructive effects efficiently and accurately, supporting the robust real-time dynamic risk management and decision-making about mitigation design. Thus, the optimized physics-informed GNN may be applied to implement spatiotemporal second-level prediction of overpressure distribution and explosion wave propagations occurring in the scene involving spatial obstacles. The proposed method that leverages the physics-informed GNN for gas explosion prediction in an obstructed gas explosion scenario can realize high efficient, fast and accurate prediction of explosion overpressure, reduce the amount of data calculation and improve the data processing efficiency, as compared to the conventional and the state-of-the-art prediction methods.

The present disclosure seeks to provide a method for predicting gas explosion for solving a technical problem in the related art that the conventional explosion prediction methods are not applicable to prediction of gas explosion occurring in a scene involving complex spatial obstacles, and have very low prediction accuracy. The method includes:

obtaining a geometric model with spatial obstacles, where the geometric model includes map grid information, and a stator vector of each initial grid node in the map grid information includes coordinate information of the initial grid node;

determining a simulation dataset of the gas explosion
based on the geometric model, where the simulation
dataset is a dataset comprising process data of a plu-
rality of gas explosion scenes in the geometric model,
and a state vector of a spatial grid node in the simula-
tion dataset includes a first moment, the coordinate
information and a target pressure value;
optimizing, using the simulation dataset, a physics-in-
formed GNN to obtain an optimized physics-informed
GNN; and
predicting the gas explosion in a scene involving the
spatial obstacles using the optimized physics-informed
GNN.
In a preferred embodiment, said optimizing, using the
simulation dataset, the physics-informed GNN to obtain the
optimized physics-informed GNN includes:
determining a predicted pressure value of the spatial grid
node at the first moment by predicting through the
physics-informed GNN;
determining the target pressure value of the spatial grid
node at the first moment;
establishing a loss function of the physics-informed GNN
based on a difference between the target pressure value
of the spatial grid node and the predicted pressure value
of the spatial grid node, and
using the loss function to optimize the physics-informed
GNN so as to obtain the optimized physics-informed
GNN.
In a preferred embodiment, before said determining the
predicted pressure value of the spatial grid node at the first
moment by predicting through the physics-informed GNN,
the method further includes:
adjusting a target pressure value of a rigid node to
eliminate an interference of the spatial obstacle in the
gas explosion, where the rigid node is a spatial grid
node corresponding to the spatial obstacle.
In a preferred embodiment, said adjusting the target
pressure value of the rigid node includes:
setting a target pressure value of the spatial grid node
corresponding to the spatial obstacle to zero.
In a preferred embodiment, said adjusting the target
pressure value of the rigid node includes:
deleting the target pressure value of the spatial grid node
corresponding to the spatial obstacle.
In a preferred embodiment, said determining the target
pressure value of the spatial grid node at the first moment
includes:
determining the distance between the spatial grid node
and the ignition point of the gas explosion through the
coordinate information of the spatial grid node and
coordinate information corresponding to the ignition
point; and
determining the target pressure value of the spatial grid
node at the first moment based on the distance between
the spatial grid node and the ignition point of the gas
explosion, the first moment, a thermal expansion rate of
the gas explosion, a radius of a flame surface of the gas
explosion, and an air density.
In a preferred embodiment, said obtaining the geometric
model with the spatial obstacles includes:
obtaining contour data having the spatial obstacles, where
coordinates of the contour data are longitudes and
latitudes in a geographic coordinate system;
converting the coordinates of the contour data from the
geographic coordinate system into a projected coordi-
nate system;

determining the map grid information and the plurality of
initial grid nodes in the map grid information based on
the contour data in the projected coordinate system; and
generating the geographic model having the spatial
obstacles based on the plurality of initial grid nodes and
edges formed between the plurality of initial grid
nodes.
The present disclosure also seeks to provide a VR-based
emergency training system, including: an AI-powered simu-
lation engine configured to receive parameter configurations
of a virtual accidental scenario for emergency training and
simulate the virtual accidental scenario for emergency train-
ing according to the parameter configurations of the virtual
accidental scenario, where the parameter configurations
includes leakage conditions, wind conditions; a group of VR
devices/equipment used by a trainee to perform physical
operations with industrial equipment/tools within the virtual
accidental scenario; and a plurality of IoT sensors config-
ured to collect real-time data on the trainee's performance/
operations (e.g., the trainee's physical operations with
industrial equipment/tools) within the virtual accidental sce-
nario. Where, the AI-powered simulation engine is further
configured to generate, in response to the trainee's opera-
tions within the virtual accidental scenario, prediction data
of an evolving accidental scenario based on the captured
real-time data on the trainee's performance/operations
within the virtual accidental scenario, and interact with the
trainee by presenting the evolving accidental scenario to the
trainee.
In a preferred embodiment, the AI-powered simulation
engine includes a physics-informed GNN leak solver and a
physics-informed GNN blast solver. The physics-informed
GNN leak solver further includes: an input layer configured
to receive the accidental scenario condition data collected
via the IoT sensors; GNN layers configured to extract spatial
latent features from the accidental scenario condition data of
the input layer; and an output layer configured to generate
final leakage and dispersion predictions based on the spatial
latent features from the GNN layers. The physics-informed
GNN blast solver is configured to simulate real-time evo-
lution of industrial gas explosion based on initial conditions
by using an improved ordinary differential equation (ODE)
that represents a connection between flame propagation and
overpressure evolution, where the initial conditions include
an ignition position and industrial facility configurations.
In a preferred embodiments, each group of VR devices
includes: a display configured to present the virtual acci-
dental scenario; VR headsets worn by a trainee; treadmills
where the trainee stands on; and a handheld controller
configured to be manually manipulated by the trainer to
perform physical operations with industrial equipment/tools
within the virtual accidental scenario.
The present disclosure also seeks to provide a VR-based
emergency training method. The method includes following
steps: simulating, via an AI-powered simulation engine, a
virtual accidental scenario for emergency training based on
parameter configurations of the virtual accidental scenario
collected via a plurality of IoT sensors; capturing real-time
data on a trainee's performance/operations (e.g., the train-
ee's physical operations with industrial equipment/tools)
within the virtual accidental scenario for emergency training
via the plurality of IoT sensors; and generating, in response
to the trainee's operations within the virtual accidental
scenario, prediction data of an evolving accidental scenario
based on the captured real-time data on the trainee's per-
formance/operations within the virtual accidental scenario for emergency training, and presenting the evolving accidental scenario to the trainee.

In a preferred embodiment, the method further includes: generating and storing detailed logs of simulation of the evolving accidental scenario.

As compared to the related art, the embodiments of the present disclosure at least have the following beneficial effects:

The present disclosure provides a method for predicting gas explosion, a terminal device and a storage medium. In the method for predicting gas explosion, the geometric model with spatial obstacles is obtained first, and the simulation dataset of gas explosion in the geometric model is determined based on the geometric model, the coordinate information of each initial grid node in the geometric model is determined through the geographic grid information, a graph having nodes and edges is provided for subsequent training through the physics-informed GNN. The target pressure values of a plurality of spatial grid nodes in the gas explosion scene at the first moment are further determined based on the coordinate information, and these target pressure values of the plurality of spatial grid nodes are added into the state vectors of the plurality of spatial grid nodes to constrain the data trained through the physics-informed GNN in the gas explosion scene involving spatial obstacles.

Furthermore, the predicted pressure value of the spatial grid node at the first moment may be predicted based on the simulation dataset and the physics-informed GNN, and the loss function of the physics-informed GNN may be established through the difference value between the target pressure value and the predicted pressure value of the spatial grid node, and the physics-informed GNN is optimized through the loss function to obtain the optimized physics-informed GNN. Then, the gas explosion in the scene involving spatial obstacles may be predicted based on the optimized physics-informed GNN. By introducing the physics-informed GNN which has the potential/ability to analyze the obstructed gas explosion destructive effects efficiently and accurately in the method for predicting gas explosion, this method may apply the physics-informed GNN to predict gas explosion in the scene involving spatial obstacles fast and accurately to realize second-level prediction for overpressure distribution and explosion wave propagation in the scene involving spatial obstacles. Thus, this method may realize fast and accurate prediction of explosion overpressure in the obstructed gas explosion scenario, reduces the amount of data calculation and improve the data processing efficiency, as compared to the conventional explosion prediction methods.

The present disclosure also provides a VR-based emergency training system and a VR-based emergency training method which aim at providing the trainees with a virtual accidental scenario for emergency training based on accidental scenario condition data collected via IoT sensors, enabling the trainees to physically interact with the virtual accidental scenario using various VR devices and industrial equipment/tools, move around, and take appropriate actions within the virtual accidental scenario to mitigate the evolving emergency situation, thereby providing the trainees with a fully immersive, team-based training exercises within the virtual accidental scenario, thus avoiding the trainees from accidental injuries.

The VR-based emergency training system's data collection and analysis capabilities enable comprehensive performance tracking and debriefing. Thus, trainers are allowed to review detailed logs of simulation of the evolving accidental scenario, identify skill gaps, and optimize the training curriculum based on the trainee's performance on the team-based training exercises.

The above description is merely summary of the technical solutions of the present disclosure, in order to more clearly understand the technical means of the present disclosure, the technical means of the present disclosure may be implemented according to the contents of the specification, in order to make the above and other objectives, features and advantages of the present disclosure to be more obvious and understandable, the embodiments of the present disclosure are described below.

DESCRIPTION OF THE DRAWINGS

In order to describe the embodiments of the present disclosure more clearly, a brief introduction regarding the accompanying drawings that need to be used for describing the embodiments of the present disclosure or the associated technologies is given below. It is obvious that the accompanying drawings described below are merely some embodiments of the present disclosure, a person of ordinary skill in the art may also obtain other drawings according to the current drawings without paying creative works.

FIG. 2 illustrates a flowchart of generating a geometric model in accordance with one embodiment of the present disclosure;

FIG. 3 illustrates a flowchart of optimizing a physics-informed GNN in accordance with one embodiment of the present disclosure;

DETAILED DESCRIPTION OF EMBODIMENTS

Figure 1:
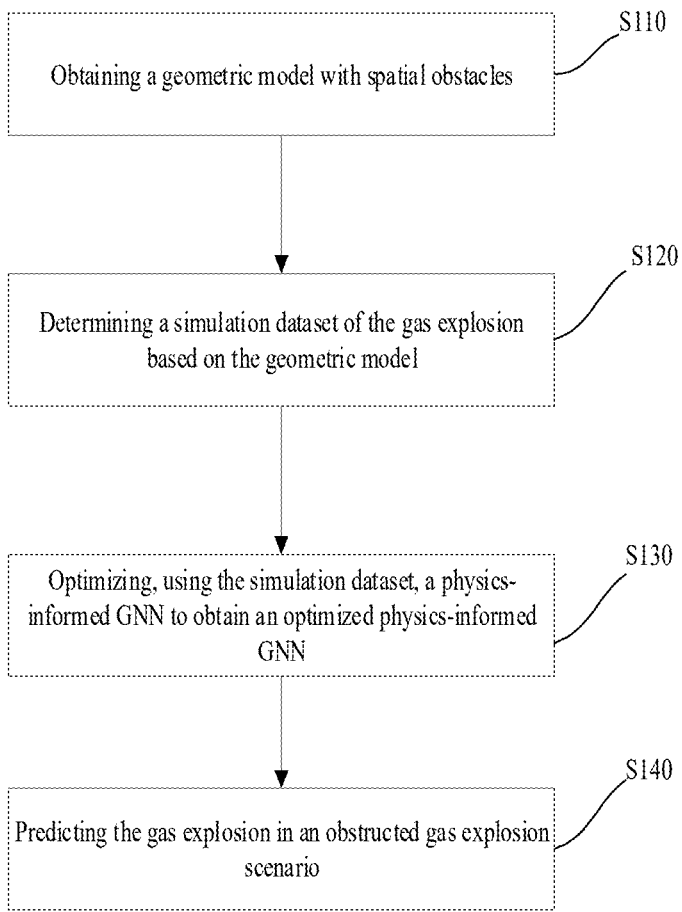
FIG. 1 illustrates a flowchart of a method for predicting gas explosion in accordance with one embodiment of the present disclosure.

In the following descriptions, in order to describe, rather than limiting the present disclosure, concrete details including specific system structure and technique are proposed to facilitate comprehensive understanding of the embodiments of the present disclosure. However, a person of ordinarily skill in the art should understand that, the present disclosure may also be implemented in some other embodiments without these concrete details. In other conditions, detailed explanations of method, device, circuit and system well known to the public are omitted, such that unnecessary details can be avoided from disturbing the description of the present disclosure.

It should be understood that, when a term "comprise" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be also understood that, terms "and/or" used in the description and the annexed claims of the present disclosure are referred to as any combination of one or a plurality of listed item(s) associated with each other and all possible items, and including these combinations.

It should also be understood that, when a term "if" is used in the description and annexed claims, the term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

With the wide application of liquefied natural gas, liquefied hydrogen and other liquefied gas in urban energy transformation, emission of greenhouse gas is effectively reduced. A steam cloud with a large area may be formed in a region due to accidental release of liquefied gas and the steam cloud may cover large-area buildings, thereby causing an urban-scale gas explosion accident.

As discussed in the background, aiming at a gas explosion accident, an influence of the gas explosion may be reduced through gas explosion prediction. In the related art, gas explosion generated at a specified position (e.g., a gas station, a tunnel, a pipeline, etc.) is usually predicted through an approach that combines a computational fluid dynamics (CFD) method with an empirical model. There are low-density spatial obstacles in the area corresponding to the specified position such as the gas station, the tunnel, the pipeline, and these obstacles have little influence on the gas explosion prediction. Thus, the gas explosion may be accurately predicted through the approach that combines the CFD method with the empirical model.

However, regarding a region with spatial obstacles, or even a region having complex spatial obstacles, there are various shapes and types of obstacles, and these obstacles may be discretely distributed. For example, for an urban-scale region, the urban-scale region is provided with various spatial obstacles such as street facilities, buildings, and greening facilities, and in most cases, the spatial obstacles in the urban-scale region are dense.

The existing method for predicting gas explosion seeks to predict gas explosion that occurs at the specified position having low-density spatial obstacles, and has a low prediction accuracy on the prediction of gas explosion that occurs in the scene having high-density spatial obstacles, such as a city, and has a poor prediction effect accordingly.

In order to solve the above problems, a method for predicting gas explosion is provided in the embodiments of the present disclosure. In the method for predicting gas explosion, a geometric model with spatial obstacles is obtained first, and simulation dataset of gas explosion in the geometric model is determined based on the geometric model, the coordinate information of each initial grid node in the geometric model is determined through the geographic grid information, a graph with nodes and edges is provided for subsequent training through a physics-informed GNN. The physics-informed GNN are an implementation of physics-informed AI (PIAI). The physics-informed GNN incorporate physical laws (e.g., conservation laws, governing equations) directly into the loss function of a neural network. The network is trained to minimize both data-driven errors and violations of the physical constraints.

Target pressure values of a plurality of spatial grid nodes at the first moment in the gas explosion scene are further determined based on the coordinate information, and the target pressure values of the plurality of spatial grid nodes are integrated into the state vectors of the various spatial grid nodes so as to constrain the data trained through the physics-informed GNN in the gas explosion scene involving spatial obstacles.

Furthermore, the predicted pressure value of the spatial grid node at the first moment may be predicted based on the simulation dataset and the physics-informed GNN, and the loss function of the physics-informed GNN may be established through the difference value between the target pressure value and the predicted pressure value of the spatial grid node, and the physics-informed GNN is optimized through the loss function to obtain an optimized physics-informed GNN. Then, the gas explosion in the scene involving spatial obstacles may be predicted based on the optimized physics-informed GNN. The method for predicting gas explosion is provided to realize second-level prediction for overpressure distribution and explosion wave propagation in the scene involving spatial obstacles, improve the prediction accuracy of gas explosion in the scene involving spatial obstacles, and reduces the amount of data calculation and improve the data processing efficiency as compared to the conventional prediction methods.

The method for predicting gas explosion will be described in detail below with reference to the embodiments of the present disclosure and the accompanying drawings.

FIG. 1 illustrates a flowchart of the method for predicting gas explosion in accordance with one embodiment of the present disclosure, as shown in FIG. 1, the method for predicting gas explosion includes a following step S110.

At the step S110, a geometric model with spatial obstacles is generated, where the geometric model has map grid information, and a state vector of an initial grid node in the map grid information includes coordinate information of the initial grid node.

It should be understood that the geometric model with the spatial obstacles is a three-dimensional model. In this embodiment of the present disclosure, the shapes and the types of the spatial obstacles are diversified, and these obstacles may be discretely distributed. For example, for an urban-scale area, the urban-scale area is provided with spatial obstacles such as street facilities, buildings, and greening facilities are provided.

For example, the geometric model with the spatial obstacles may be a geometric model of a street of a city, a geometric model of a part of the street of the city, a geometric model of a factory area, etc., and the spatial obstacles in each geometric model may be crowded and compact.

A plurality of initial grid nodes in the geometric model may be determined through the map grid information in the geometric model. Furthermore, edges connected between the plurality of initial grid nodes in the geometric model may be determined through the coordinate information of the initial grid node. Then, the graph corresponding to the geometric model may be formed by combining the initial grid nodes with the edges.

In some embodiments, the initial grid node may further have attributes of state features, such as an environmental condition corresponding to the initial grid node. An prediction accuracy of gas explosion in various actual application environments is further improved by adding the state vector such as the environmental condition.

In the geometric model, the initial grid nodes and the edges are combined to form the graph corresponding to the geometric model, so that the graph corresponding to the geometric model may be trained for gas explosion prediction subsequently by using the neural network model.

In some embodiments, in order to enable the geometric model to be applied to various actual scenes with spatial obstacles better, FIG. 2 illustrates a flowchart of the step S110 of generating a geometric model with spatial obstacles. As shown in FIG. 2, the step S110 may include following substeps S1101-1104.

At the step S1101, contour data with spatial obstacles are obtained, where the coordinates of the contour data are longitudes and latitudes of a geographic coordinate system.

In some embodiments, the contour data with spatial obstacles may be generated by a geographic information system (Geographic Information System, GIS), a computer aided design (Computer Aided Design, CAD), or the like. It should be understood that the contour data does not have an initial grid node.

At the step S1102, the coordinates of the contour data is converted from the geographic coordinate system into a projected coordinate system.

Through conversion of the coordinates, the coordinate information in the generated geometric model may represent a corresponding actual distance. Thus, usability of the method of the present disclosure in an actual application scene is improved.

At the step S1103, map grid information and initial grid nodes in the map grid information are determined based on the contour data in the projected coordinate system.

At the step S1104, the geographic model with spatial obstacles is generated based on the map grid information and the initial grid node in the map grid information.

By processing the contour data and adding the initial grid nodes and edges determined by the initial grid nodes into the contour data, the contour data is converted into graph with nodes and edges, and the geometric model with spatial obstacles is generated accordingly.

In some embodiments, the method further includes a following step S120. In the step S120, a simulation dataset of gas explosion is determined based on the geometric model. The simulation dataset is a dataset including process data of a plurality of gas explosion scenes in the geometric model.

In this geometric model, multiple groups of gas explosion processes may be formed by changing a position of an ignition point. For each group of gas explosion processes, multiple graphs corresponding to different moments in the gas explosion process are also different. Thus, multiple graphs corresponding to different moments in the gas explosion process in the geometric model are formed, and the simulation dataset is determined.

The state vector of a spatial grid node in the simulation dataset includes a first moment, coordinate information and a target pressure value. The target pressure value is a pressure value of a corresponding position of the spatial grid node at the first moment during the gas explosion process.

In the embodiments of the present disclosure, the coordinate information of the spatial grid node is the same as the coordinate information of the initial grid node.

It should be noted that the coordinate information may be a coordinate value, or include a coordinate value and a distance between the spatial grid node and the ignition point.

It should be understood that the position of each spatial grid node in each graph in the simulation dataset corresponds to the position of the initial grid node in the corresponding graph of the geometric model.

It should be noted that, in order to obtain a more accurate prediction result using the neural network model for processing the graph structure data, the physical information constraint of the spatial obstacles on the gas explosion pressure is added in the state vector of the spatial grid node. That is, a gas explosion pressure distribution condition at the corresponding position of each spatial grid node is considered under the scene involving spatial obstacles.

The target pressure value of the spatial grid node in the gas explosion process at the first moment is determined by the distance between the spatial grid node and the ignition point of the gas explosion, the first moment, a thermal expansion rate of the gas explosion, a radius of flame surface of the gas explosion and an air density. It should be understood that the distance between the spatial grid node and the ignition point of the gas explosion is determined by the coordinate information of the spatial grid node and the coordinate information of the ignition point.

In some embodiments, the target pressure value of the spatial grid node in the gas explosion process at the first moment may be determined by using a following formula which is expressed as:

$$ p = \frac{\rho_{air}}{R} \frac{E-1}{E} \left\{ 2r_f \left( \frac{dr_f}{dt} \right)^2 + r_f^2 \frac{d^2 r_f}{dt^2} \right\}. $$

In this formula, p represents the target pressure value, $\rho_{air}$ represents the air density, R represents the distance between the spatial grid node and the ignition point of the gas explosion, E represents a thermal expansion rate of the gas explosion, $r_f$ represents a radius of the flame surface of the gas explosion, and t represents the first moment.

The state vector of each spatial grid node includes the target pressure value. Thus, pressure distributions of all spatial grid nodes corresponding to the plurality of graphs in the simulation dataset may be determined. Therefore, the state vector of the spatial grid node represents the variation of the pressure value at the corresponding position of the spatial grid node over time, and an edge represents a mutual influence between the pressure values of the adjacent spatial grid nodes.

In some embodiments, the simulation dataset of the gas explosion processes in the geometric model may be determined by CFD.

By way of example rather than limitation, the simulation dataset of the gas explosion processes in the geometric model may be determined by invoking an OpenFOAM, or a CFD-based software such as a FLACS-Fire Dynamics Simulator.

For example, the geometric model is input into an invoked FLCS-Fire Dynamics Simulator software to determine the simulation dataset of the gas explosion processes in the geometric model. In order to ensure the richness and variability of the simulation dataset, multiple groups of gas explosion processes may be generated by changing the coordinates of the ignition point. For the time duration of each group of gas explosion processes, data at different moments may be generated by presetting time steps. The target pressure values of each spatial grid node at all time steps are recorded, and are trained and tested by the neural network model for processing graph structure data.

For example, if a group of gas explosion durations is 300 ms, and each time step is 3 ms, which means that, the group of gas explosion durations is composed of data corresponding to 100 moments. That is, in the group of gas explosion durations 300 ms, the state vector of the grid node is obtained every 3 ms.

In this embodiment of the present disclosure, the establishing of the environment where the gas explosion source and the spatial obstacles are located is fully considered, a physics-informed GNN may be trained to an optimized model being approximate to the application scene. Thus, the method for predicting gas explosion in this embodiment of the present disclosure has universality.

In some embodiments, the method further includes a following step S130. In the step S130, the simulation dataset is used to optimize a physics-informed GNN to obtain optimized physics-informed GNN. In some embodiments, as shown in FIG. 3, the step S130 further includes following steps S1301-1304.

At the step S1301, a predicted pressure value of the spatial grid node at the first moment is determined by predicting through the physics-informed GNN.

In this embodiment of the present disclosure, data corresponding to the gas explosion that needs to be predicted is represented as a graph including nodes, edges, and corresponding features (which may also be referred to as state vectors), and huge data in the simulation dataset is trained through the physics-informed GNN. A calculation cost of the data may be reduced, the data processing efficiency is improved.

Different models may have different characteristics, and an appropriate model may be selected according to data characteristics in the geometric model.

In some embodiments, the physics-informed GNN may be abbreviated as Physics_GNN that combines Physics-informed neural network (PINN) with a graph neural network (GNN). The physics-informed GNN enhances the accuracy and the reliability of gas explosion predictions in scenarios involving obstructions because of presenting the interaction between the obstacles, flame and blast wave propagation compared to the state-of-the-art prediction models. The physics-informed GNN has the potential to analyze the obstructed gas explosion destructive effects efficiently and accurately, supporting the robust real-time dynamic risk management and decision-making about mitigation design.

The reference dataset may be divided into training data, verification data and prediction data, and the predicted pressure value of the spatial grid node at the first moment is predicted through the GNN model.

In this embodiment of the present disclosure, the predicted pressure value at the first moment may be predicted only by using spatial grid nodes at consecutive moments (that is, the first moment and a previous moment of the first moment).

In other words, for any spatial grid node, the predicted pressure value of the position corresponding to the coordinate of the spatial grid node at the first moment may be predicted based on the target pressure value of the spatial grid node at the previous moment.

For example, each spatial grid node is represented as $X=[1_x, 1_y, t, P^t]$, in this formula, X represents the spatial grid node, $1_x$, $1_y$ represent coordinates of the spatial grid node, t represents the previous moment, $P^t$ represents a target pressure value at the previous moment, a predicted pressure value $f_\theta(P^t)$ of the spatial grid node at the next moment t+1 is output through the graph neural network model, $f_\theta$ represents a GNN model parameterized by weight and variance of the neural network.

In some other embodiments, parameter $\theta$ of the GNN model, that is, the weight and the variance of the GNN model, may be optimized by using an optimizer.

The graph corresponding to the gas explosion and the surrounding spatial obstacles is formed, and data of consecutive moments is processed during the training process of the graph neural network model, thus, spatiotemporal evolution of gas explosion is provided. Moreover, a second-level prediction result for gas explosion may be realized by adjusting the difference between the previous moment and the first moment. As an example, the difference between the previous moment and the first moment is set to 10 ms to improve the prediction efficiency of gas explosion.

Figure 5:
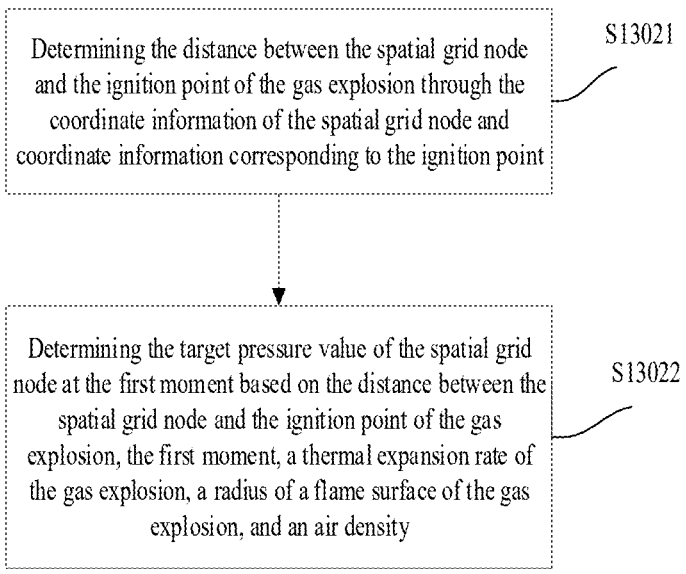
FIG. 5 illustrates a flowchart of determining a target pressure value of the spatial grid node at the first moment in accordance with one embodiment of the present disclosure.

At the step S1302, the target pressure value of the spatial grid node at the first moment is determined. In some embodiments, as shown in FIG. 5, the step 1302 may further include the following substeps: step 13021) determining the distance between the spatial grid node and the ignition point of the gas explosion through the coordinate information of the spatial grid node and coordinate information corresponding to the ignition point; step 13022) determining the target pressure value of the spatial grid node at the first moment based on the distance between the spatial grid node and the ignition point of the gas explosion, the first moment, a thermal expansion rate of the gas explosion, a radius of a flame surface of the gas explosion, and an air density.

At the step S1303, a loss function of the physics-informed GNN is established based on the difference between the target pressure value and the predicted pressure value of the spatial grid node.

In some embodiments, the loss function between the predicted pressure value and the target pressure value may be determined by standard squared difference calculation. The physical laws (e.g., conservation laws, governing equations) are incorporated into the loss function.

When the physics-informed GNN is the GNN model, the loss function may be determined by using the following formula expressed as:

$$L\left(P^t, P^{t+1}; \theta\right) = \left\| f_\theta(P^t) - P^{t+1} \right\|^2$$

In this formular, L represents the loss function, $P^t$, $P^{t+1}$ represent the target pressure values of the spatial grid node at two consecutive moments, respectively, $\theta$ represents the parameter of the GNN model, $f_\theta(P^t)$ represents a predicted pressure value of the spatial grid node at the moment t+1, and $P^{t+1}$ represents the target pressure value of the spatial grid node at the moment t+1.

At the step S1304, the physics-informed GNN is optimized through the loss function to obtain the optimized physics-informed GNN.

A predicted loss is determined by the loss function, update of the parameters of the physics-informed GNN is performed iteratively. Thus, the predicted pressure value predicted by the physics-informed GNN is enabled to be approximate to the target pressure value.

That is, for the GNN model, the GNN model is trained in an autoregressive manner.

GNN pair data includes an encoding, processing, and decoding process, and the GNN model is trained by using an encoder, a processor, and a decoder, and an optimized physics-informed GNN is obtained.

For the encoding process of the GNN model, the spatial grid nodes in the graph is encoded by an encoder to obtain an encoded latent graph G, where G=(V, E). G represents a distribution diagram of target pressures in explosion spaces (i.e., the spatial regions included in the plurality of graphs in the simulation dataset), V represents features of the spatial grid nodes in the explosion space, E represents an associated feature between spatial grid nodes and is implemented by using a multi-layer perceptron (Multi-Layer Perceptron, MLP).

The processor is configured to update a latent map by learning a message passing process, and update a node and an edge by using the MLP, that is, the process is implemented by using two-layer MLP with residual connection.

The decoding is a prediction of each spatial grid node and the moment generated by the final latent map.

In some embodiments, verification data and prediction data (including data of a plurality of application scenes) may be used to verify that the optimized physics-informed GNN has general applicability for an accidental scene involving spatial obstacles.

In some embodiments, the method further includes a step S140. In the step S140, the gas explosion in the scene involving spatial obstacles is predicted based on the optimized physics-informed GNN.

In summary, the method for predicting gas explosion in the present disclosure is provided to obtain an optimized physics-informed GNN and use this optimized physics-informed GNN to realize second-level prediction for overpressure distribution and explosion wave propagation in the scene involving spatial obstacles. By introducing the physics-informed GNN which has the potential/ability to analyze the obstructed gas explosion destructive effects efficiently and accurately in the method for predicting gas explosion, this method may apply the physics-informed GNN to predict gas explosion in the scene involving spatial obstacles fast and accurately to realize second-level prediction for overpressure distribution and explosion wave propagation in the scene involving spatial obstacles. Thus, this method may realize fast and accurate prediction of explosion overpressure in the obstructed gas explosion scenario, reduces the amount of data calculation and improve the data processing efficiency, as compared to the conventional explosion prediction methods.

Figure 4:
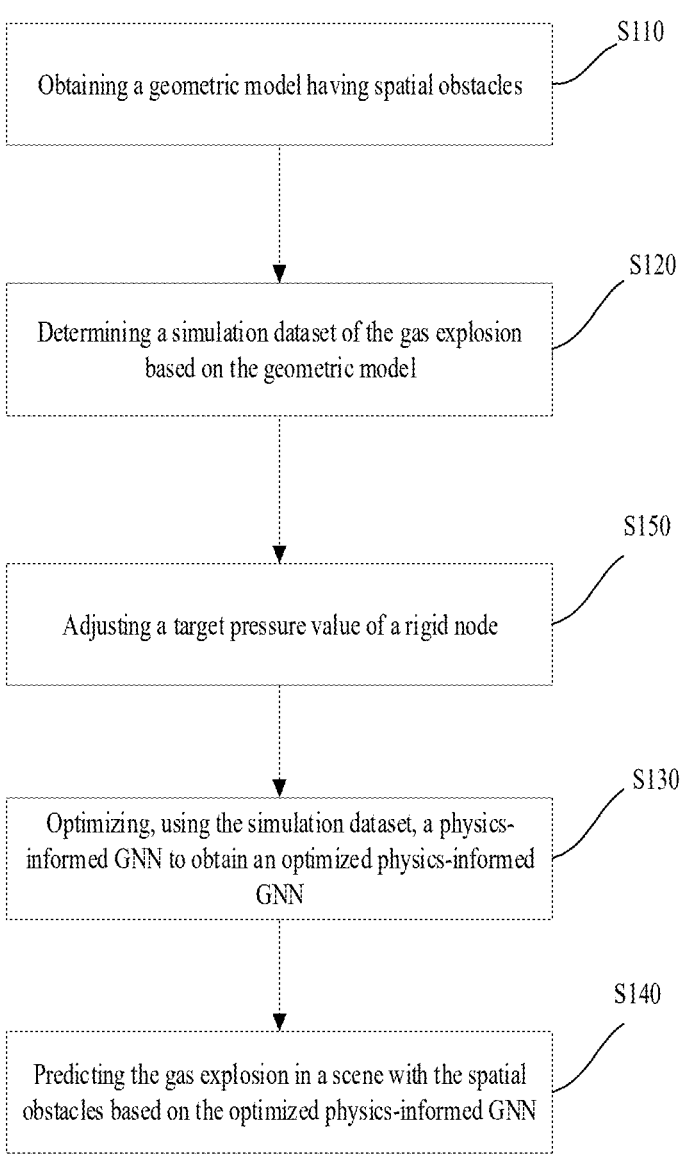
FIG. 4 illustrates a flowchart of another method for predicting gas explosion in accordance with one embodiment of the present disclosure.

In some embodiments, in order to eliminate the influence of the spatial obstacles on the gas explosion, another method for predicting gas explosion prediction is further provided in the embodiments of the present application. As shown in FIG. 4, FIG. 4 illustrates a flowchart of another method for predicting gas explosion provided in the embodiments of the present disclosure. By way of example rather than limitation, as shown in FIG. 4, compared with the method for predicting gas explosion shown in FIG. 1, this method further includes a following step 150, before the step S1301 of determining the predicted pressure value of the spatial grid node at the first moment by predicting through the physics-informed GNN.

In the step of S150, a target pressure value of a rigid node is adjusted based on a preset difference processing strategy, where the rigid node is defined as a spatial grid node corresponding to a spatial obstacle.

The preset difference processing strategy is used to eliminate an interference of the spatial obstacle in the gas explosion.

The spatial grid node corresponding to the spatial obstacle, that is, the rigid node, is processed by the preset difference processing strategy. Thus, an interaction between a shock wave of the gas explosion and the space obstacle is improved, and a prediction precision of gas explosion is improved.

In some embodiments, the target pressure value of the rigid node may be adjusted by setting the target pressure value of the spatial grid node corresponding to the spatial obstacle to zero. The target pressure value of the spatial grid node corresponding to the spatial obstacle is set to zero, and the predicted pressure value of the spatial grid node is adjusted correspondingly. Thus, data calculation difficulty in this method is further reduced, and a prediction efficiency of gas explosion is further improved. Consequently, this method may also realize fast and accurate prediction of explosion overpressure in the scene involving spatial obstacles, reduce the amount of data calculation and improve the data processing efficiency, as compared to the conventional gas explosion prediction methods.

In some other embodiments, the target pressure value of the rigid node may be adjusted by deleting the target pressure value of the spatial grid node corresponding to the spatial obstacle. By deleting the target pressure value of the spatial grid node corresponding to the spatial obstacle, there is no need to perform data prediction on the spatial grid node corresponding to the spatial obstacle, the calculation amount is reduced, and the prediction speed of gas explosion is improved.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to implementation processes of the embodiments of the present application.

Figure 6:
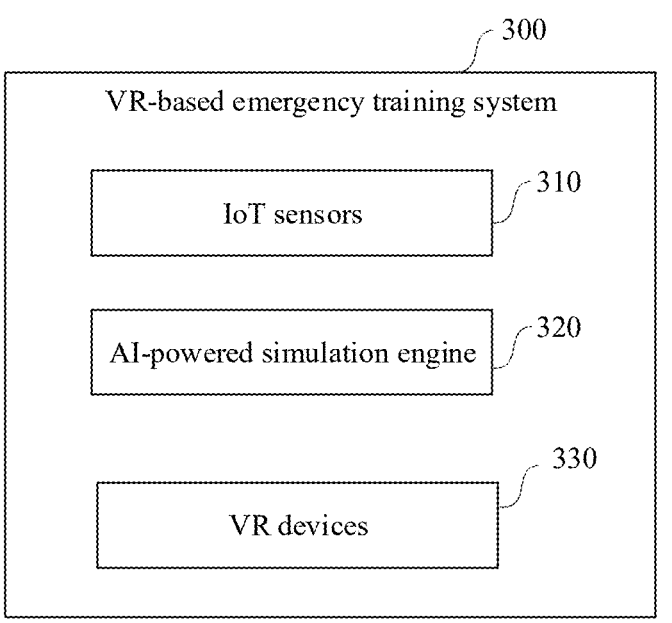
FIG. 6 illustrates a schematic structural diagram of a VR-based emergency training system in accordance with one embodiment of the present disclosure.

A virtual reality (VR)-based emergency training system 300 is further provided in the embodiments of the present disclosure. As shown in FIG. 6, the VR-based emergency training system 300 includes: an AI-powered simulation engine 320 configured to receive parameter configurations of a virtual accidental scenario for emergency training and simulate the virtual accidental scenario for emergency training according to the parameter configurations of the virtual accidental scenario, where the parameter configurations includes leakage conditions, wind conditions; a group of VR devices 330 used by a trainee to perform operations within the virtual accidental scenario; and a plurality of internet of things (IoT) sensors 310 configured to collect real-time data on the trainee's performance/operations (e.g., the trainee's physical operations with industrial equipment/tools) within the virtual accidental scenario. The AI-powered simulation engine 320 is further configured to generate, in response to the trainee's operations within the virtual accidental scenario, prediction data of an evolving accidental scenario based on the captured real-time data on the trainee's performance/operations within the virtual accidental scenario, and present the evolving accidental scenario to the trainee.

Figure 7:
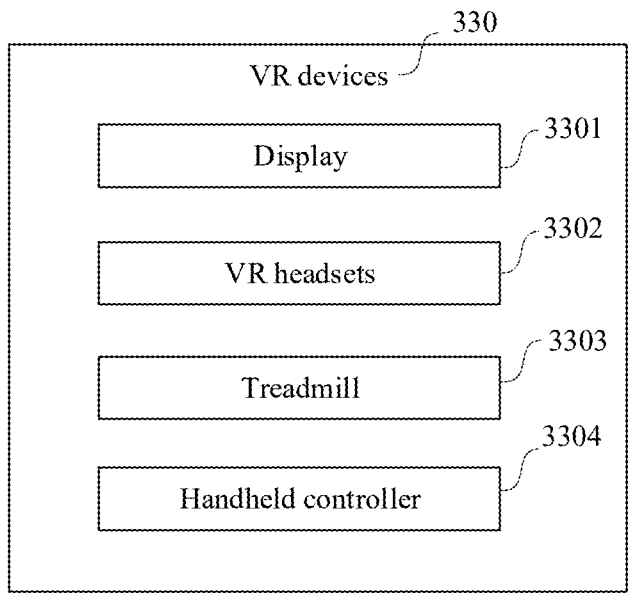
FIG. 7 illustrates a schematic structural diagram of an AI-powered simulation engine of the VR-based emergency training system in accordance with one embodiment of the present disclosure.

In some embodiments, as shown in FIG. 7, each group of VR devices 330 includes: a display 3301 configured to present the virtual accidental scenario; VR headsets 3302 worn by a trainee; treadmills 3303 where the trainee stands on; and a handheld controller 3304 configured to be manually manipulated by the trainer to perform the physical operations with the industrial equipment/tools within the virtual accidental scenario.

Figure 8:
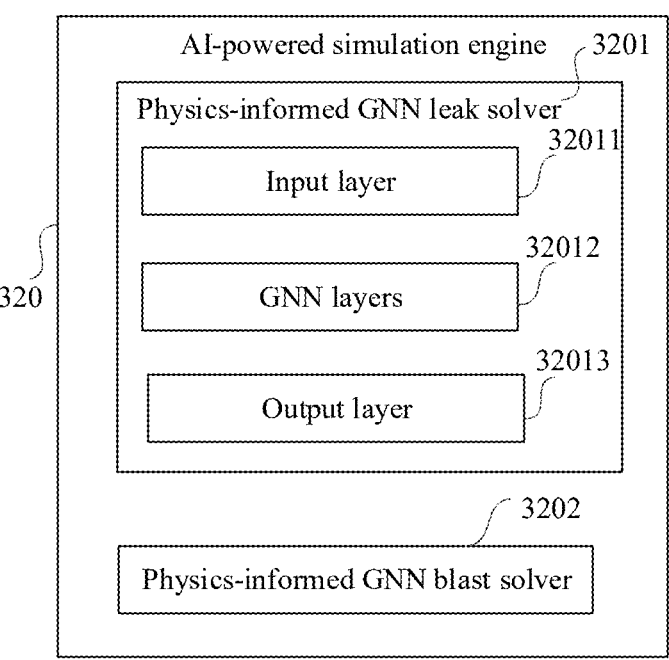
FIG. 8 illustrates a schematic structural diagram of VR devices of the VR-based emergency training system in accordance with one embodiment of the present disclosure.

In some embodiments, as shown in FIG. 8, the AI-powered simulation engine 320 may be an AI-powered physics-informed GNN simulation engine 320 consisting of a physics-informed GNN leak solver 3201 and a physics-informed GNN blast solver 3202. The AI-powered physics-informed GNN simulation engine 320 applies the above-mentioned physics-informed GNN and Partial/Ordinary differential equations to accelerate industrial leak and explosion simulation, allowing to generate highly dynamic, unpredictable accidental scenarios.

In some embodiments, further referring to FIG. 8, the physics-informed GNN leak solver 3201 includes: an input layer 32011 configured to receive the accidental scenario condition data collected via the IoT sensors 310; GNN layers 32012 configured to extract spatial latent features from the accidental scenario condition data of the input layer 32011; and an output layer 32013 configured to generate final leakage and dispersion predictions based on the spatial latent features from the GNN layers 32012. Automatic differentiation is leveraged to perform differential operations on every graph node, allowing the governing equations of industrial leakage and dispersion to be solved. The framework of the physics-informed GNN leak solver 3201 may be used to simulate the real-time evolution of released plume concentration and potential flammable areas, based on the evolving accidental scenario conditions collected via the IoT sensors 310. The variation in accidental scenario conditions, such as leakage conditions, may be induced by subsequent physical interactions of the trainees with the industrial equipment/tools (e.g., shutting down emergency valves) and the evolving accidental scenario.

The physics-informed GNN blast solver 3202 is configured to simulate real-time evolution of industrial gas explosion (i.e., flames and blast wave propagation) based on initial conditions by using an improved ordinary differential equation (ODE). The initial conditions may include an ignition position, industrial facility configurations (obstacles and confinement configuration), and flammable cloud area. The improved ODE represents a connection between flame propagation and overpressure evolution, and is used to predict the spatiotemporal blast load dynamics. The improved ODE is expressed as:

$$p(x, y, t) = \beta(x, y)(\rho_{air}/R(x, y)\left(1 - 1/E)(2r_f(dr_f/dt)^2 + r_f^2(d^2r_f/dt^2).\right.$$

In this expression, R represents the target position at which time-series overpressure is predicted, p(x, y, t) represents an overpressure at a target position with coordinates x, y, t represents a time, $\rho_{air}$ represents a density of air, $r_f$ represents a flame propagation distance from an ignition point, E represents a ratio, $\beta(x, y)$ represents physical enhancement factor of each grid point. The physical enhancement factor $\beta(x, y)$ is proposed to calibrate the overpressure dynamics prediction with congestions.

The VR-based emergency training system 300 integrates the AI-powered simulation engine 320 with the industrial-grade virtual reality (VR) devices/hardware, including VR headsets, controllers and treadmills, thereby providing trainees with a fully immersive, team-based training exercises, enabling trainees to physically interact with the virtual accidental scenario, move around, and take actions to mitigate the evolving emergency situation. More specifically, the VR-based emergency training system 300 enables the trainees to take appropriate actions by physically interacting with industrial equipment/tools within the virtual accidental scenario to prevent the accident escalation, such as recognizing leak and fire incidents, informing other workers, initiating emergency shutdown procedure, managing ignition source, forming a cordon, and emergency repair, etc.

Thus, the VR-based emergency training system 300 remarkably improves preparedness and decision-making skills of industrial workers, enhancing safety and risk mitigation of industrial leakage and explosion while significantly reducing training costs compared to the existing emergency training system/products/techniques.

The VR-based emergency training system 300's data collection and analysis capabilities enable comprehensive performance tracking and debriefing. Thus, trainers are allowed to review detailed logs of simulation of the evolving accidental scenario, identify skill gaps, and optimize the training curriculum based on the trainee's performance on the team-based training exercises.

Figure 9:
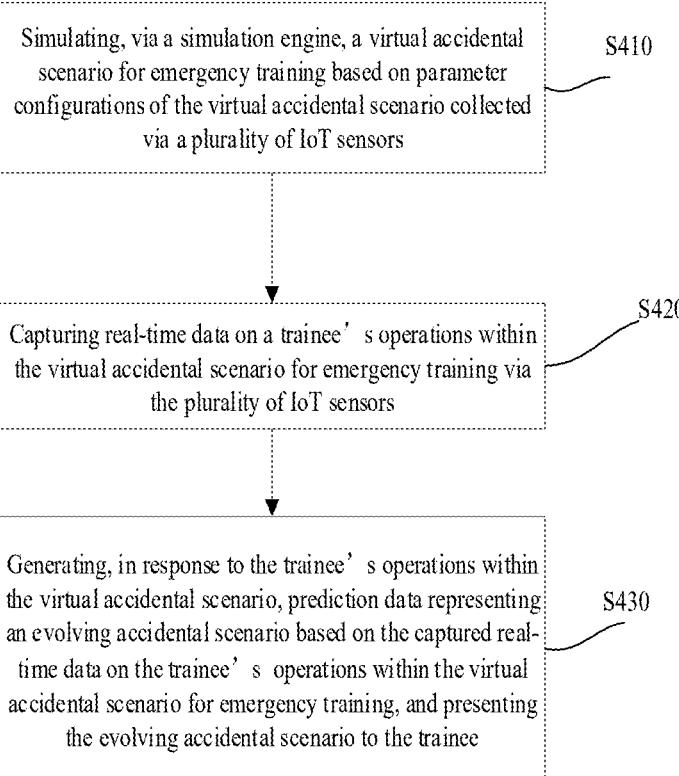
FIG. 9 illustrates a schematic flow diagram of a VR-based emergency training method in accordance with one embodiment of the present disclosure.

The present disclosure also seeks to provide a VR-based emergency training method implemented by the VR-based emergency training system 300. As shown in FIG. 9, the method includes following steps:

simulating, via a AI-powered simulation engine 320 of the VR-based emergency training system 300, a virtual accidental scenario for emergency training based on parameter configurations of the virtual accidental scenario collected via a plurality of IoT sensors 310 of the VR-based emergency training system 300;

capturing real-time data on a trainee's operations within the virtual accidental scenario for emergency training via the plurality of IoT sensors 310 of the VR-based emergency training system 300; and generating, by the AI-powered simulation engine 320 of the VR-based emergency training system 300, prediction data of an evolving accidental scenario based on the captured real-time data on the trainee's performance/operations within the virtual accidental scenario in response to the trainee's operations within the virtual accidental scenario, and presenting the evolving accidental scenario to the trainee, in order to complete team-based training exercises within the virtual accidental scenario.

In some embodiments, the method further includes:

generating and storing detailed logs of simulation of the evolving accidental scenario by the AI-powered simulation engine 320 of the VR-based emergency training system 300.

The VR-based emergency training method applies the physics-informed graph neural network that enables the description of the physical interactions between congestion, flame propagation and blast load distribution, and achieves real-time obstructed gas explosion simulation.

In conclusion, the present disclosure also seeks to propose the VR-based emergency training system 300 and the VR-based emergency training method which are directed at providing the trainees with a virtual accidental scenario for emergency training, enabling the trainees to physically interact with the virtual accidental scenario, move around, and take appropriate actions within the virtual accidental scenario to mitigate the evolving emergency situation, thereby providing trainees with fully immersive, team-based training exercises within the virtual accidental scenario, thus avoiding the trainees from accidental injuries.

In the embodiments of the present application, the describing of the embodiments in the present application are emphasized respectively. Regarding the part in some embodiments which is not described in detail, reference may be made to related descriptions in other embodiments.

The foregoing embodiments are only preferable embodiments of the present disclosure, and should not be regarded as limitations to the present disclosure. All modifications, equivalent replacements, and improvements, which are made within the spirit and the principle of the present disclosure, should all be included in the protection scope of the present disclosure.

What is claimed is:

1. A VR-based emergency training system, comprising:

an AI-powered simulation engine configured to receive parameter configurations of a virtual accidental scenario for emergency training and simulate the virtual accidental scenario for emergency training according to the parameter configurations of the virtual accidental scenario, the parameter configurations comprises leakage conditions, wind conditions, an ignition position, obstacles, confinement configuration, and flammable cloud area;

a group of VR devices used by a trainee to perform operations within the virtual accidental scenario; and a plurality of IoT sensors configured to collect real-time data on the trainee's operations within the virtual accidental scenario;

wherein the AI-powered simulation engine is further configured to generate, in response to the trainee's operations within the virtual accidental scenario, prediction data of an evolving accidental scenario based on the captured real-time data on the trainee's operations within the virtual accidental scenario, and present the evolving accidental scenario to the trainee, wherein the AI-powered simulation engine comprises a physics-informed graph neural network (GNN) leak solver and a physics-informed GNN blast solver; and the physics-informed GNN leak solver further comprises:

an input layer configured to receive virtual accidental scenario condition data collected via the plurality of IoT sensors;

GNN layers configured to extract spatial latent features from the accidental scenario condition data of the input layer; and an output layer configured to generate final leakage and dispersion predictions based on the spatial latent features from the GNN layers;

the physics-informed GNN blast solver is configured to simulate real-time evolution of industrial gas explosion based on initial conditions by using an improved ordinary differential equation (ODE) that represents a connection between flame propagation and overpressure evolution, wherein the initial conditions comprise an ignition position and industrial facility configurations.

2. The VR-based emergency training system according to claim 1, wherein each group of VR devices comprises:

a display configured to present the virtual accidental scenario;

VR headsets worn by the trainee;

treadmills where the trainee stands on; and a handheld controller configured to be manually manipulated by a trainer to perform physical operations with industrial equipment/tools within the virtual accidental scenario.

3. A VR-based emergency training method implemented by the VR-based emergency training system of claim 1, comprising:

simulating, via the AI-powered simulation engine of the VR-based emergency training system, the virtual accidental scenario for emergency training based on the parameter configurations of the virtual accidental scenario collected via the plurality of IoT sensors of the VR-based emergency training system;

capturing the real-time data on the trainee's operations within the virtual accidental scenario for emergency training via the plurality of IoT sensors of the VR-based emergency training system; and generating, by the AI-powered simulation engine of the VR-based emergency training system, the prediction data of the evolving accidental scenario based on the captured real-time data on the trainee's operations within the virtual accidental scenario in response to the trainee's operations within the virtual accidental scenario, and presenting the evolving accidental scenario to the trainee.

4. The VR-based emergency training method according to claim 3, further comprising:

generating and storing detailed logs of simulation of the evolving accidental scenario by the AI-powered simulation engine of the VR-based emergency training system.

* * * * *